United States Patent [19]

Plagge

[11] Patent Number: 4,969,077
[45] Date of Patent: Nov. 6, 1990

[54] POWER SUPPLY CIRCUIT

[75] Inventor: Joseph A. M. Plagge, Nijmegen, Netherlands

[73] Assignee: U.S. Philips Corporation, New York, N.Y.

[21] Appl. No.: 381,567

[22] Filed: Jul. 18, 1989

[30] Foreign Application Priority Data

Feb. 14, 1989 [NL] Netherlands ............................ 8900358

[51] Int. Cl.⁵ .......................... H02J 7/02; H02M 3/335
[52] U.S. Cl. ........................................ 363/19; 363/142;
320/32; 320/39
[58] Field of Search ........................ 363/18, 19, 95, 97,
363/142; 320/2, 3, 21, 32, 39

[56] References Cited

U.S. PATENT DOCUMENTS

| 4,387,418 | 6/1983 | Koike | 363/19 |
| 4,504,775 | 3/1985 | Becker | 363/19 |
| 4,647,833 | 3/1987 | Schmidt et al. | 320/21 |
| 4,652,984 | 3/1987 | van der Akker et al. | 363/19 |
| 4,684,871 | 8/1987 | Plagge | 320/21 |
| 4,706,009 | 11/1987 | Schwarz | 320/22 |
| 4,763,061 | 8/1988 | Schwarz | 363/19 |

Primary Examiner—Peter S. Wong
Attorney, Agent, or Firm—Bernard Franzblau

[57] ABSTRACT

A power supply circuit composed of a series arrangement of the primary winding of a transformer (TR), a first transistor ($T_1$) and a current measuring resistor ($R_2$). The first transistor ($T_1$) is switched by means of a second transistor ($T_2$). The second transistor is controlled by the combination of a first signal which is proportional to the intensity of the current through the current measuring resistor ($R_2$) and a second signal which is the voltage, filtered by a low-pass filter, across the secondary winding ($n_2$) of the transformer.

13 Claims, 4 Drawing Sheets

POWER SUPPLY CIRCUIT

BACKGROUND OF THE INVENTION

This invention relates to a power supply circuit for supplying a load from input voltages of different magnitude, comprising a first series arrangement of a primary winding of a transformer and a main current path of a first semiconductor switch which also has a control input, and a second series arrangement of a secondary winding of the transformer and a rectifier diode. This second series arrangement has terminals for connection of the load. The power supply circuit includes a further semiconductor switching means provided with a control input for switching-off the first semiconductor switch, and first means for supplying the control input of the further semiconductor switching means with a first signal which is a measure of the current flowing through the primary winding.

Such a circuit can, for example, be used for recharging batteries or supplying electronic devices because it is possible to connect the apparatus, without switching them over, to voltage sources of different magnitude, for example, the electric power mains in different countries. Such a power supply circuit can more specifically be used in an electric shaver in which the circuit produces the current for supplying the motor or, in the case of a rechargeable shaver, for charging the batteries.

A power supply circuit of the type defined in the opening paragraph is disclosed in the European Patent Specification No. 0 030 026, which corresponds to U.S. Pat. No. 4,504,775 (3/12/85). Said Specification describes a power supply circuit in which, after the input voltage has been applied via a starter resistor, a small current flows into the base of a first transistor which acts as the first semiconductor switch, which causes this transistor to be partly rendered conductive. In response thereto, a small primary current flows in the primary winding of the transformer. As a results in the secondary winding, a voltage is generated which results in a larger current being applied to the base of this transistor via a positive feedback circuit coupled between the secondary winding and the base of the first transistor. The transistor is fully driven to the conductive state thereby. Thereafter the primary current increases linearly versus time, during what is commonly denoted as the forward phase. In the prior-art circuit the emitter line of the first transistor incorporates a resistor with which the base-emitter junction of a second transistor is arranged in parallel. This constitutes the further semiconductor switching means. In addition, the base of the second transistor is coupled via a resistor to the junction point of the secondary winding and the rectifier diode. Via this resistor a current flows from the secondary winding through the resistor incorporated in the emitter line of the first transistor. At a given value of the sum of this current and the primary current the second transistor becomes conductive and consequently the first transistor is rendered non-conductive. This causes the forward phase to be terminated and the start of what is commonly denoted the flyback phase. Because of the energy stored in the transformer a secondary current flows in the secondary winding during the flyback phase. This current constitutes the charging current for the batteries or direct supplies the current for the relevant apparatus. The secondary current decreases linearly with time until the first transistor is turned-on again.

Because of the coupling of the base of the second transistor to the secondary winding and the rectifier diode, the second transistor is rendered conductive at an instant which is earlier according as the input voltage is higher.

Thus, the power supply circuit forms a self-oscillating power supply which produces an average constant output current at a constant input voltage. However, in spite of said coupling, the output current in this power supply still depends to a significant extent on the input voltage.

From the European Patent Specification No. 01 88 839, which corresponds to U.S. Pat. No. 4,652,984, it is also known to provide a power supply circuit with a compensation of the output current which increases with increasing input voltages. In the power supply circuit illustrated in FIG. 6 of said European Patent Specifications this is achieved in that an RC-circuit, whose resistor is connected to the secondary winding of a transformer, is used to apply a signal to the further semiconductor switching means for switching these the further semiconductor switching means. At an increasing input voltage the level of the switching voltage across the capacitor is reached faster so that the further semiconductor switching means is switched-on.

Although the use of said measures considerably limits the increase in the output current for an increasing input voltage, there nevertheless remains in the prior-art methods of mains voltage compensation a clear dependence of the output current on the input voltage. Such a dependence is disadvantageous since, in order prevent damage to the load, the current through this load, for example, the charging current of a battery or the supply current of a motor, must not exceed a given maximum value. In the prior-art supply circuit the highest permissible output current is reached only at one single input voltage and is lower at input voltages deviating therefrom. However at these other input voltages the load does not function in an optimum manner. For example, charging a battery requires more time than is otherwise necessary or a connected motor does not supply its full power.

SUMMARY OF THE INVENTION

An object of the invention is to provide a power supply incorporating a mains voltage compensation in which the output current is substantially independent of the input voltage over a wide range of the input voltage.

To that end, according to the invention, a power supply circuit of the type defined in the opening paragraph, is characterized in that the power supply circuit also includes second means for supplying the control input of the further semiconductor switching means with a second signal which is a measure of the voltage at the output of a low-pass filter arranged to filter the voltage across the secondary winding during the period of time in which the first semiconductor switch is closed. The invention is based on the recognition that, so as to obtain the same output current at different input voltages, the second semiconductor switch is to be arranged such that the maximum primary current exhibits a non-linear dependency on the input voltage. Within the input voltage range of interest, this non-linear dependency can be approximated in a satisfactory manner by combining a first signal which is proportional to the primary current with a second signal which is derived in a non-linear manner from the voltage generated in the secondary winding. It has been found that the non-linear dependence obtained by filtering the secondary voltage by means of a low-pass filter is extremely satisfactory. By terminating the forward phase at an instant determined by the value of this primary current-filtered secondary voltage combination a mean output current can be obtained which is substantially independent of the input voltage.

An embodiment of the power supply circuit according to the invention is characterized in that the low-pass filter includes a first resistor and a first capacitor, a first terminal of the first resistor being coupled to one end of the secondary winding and a second terminal of the first resistor being coupled to a first terminal of the first capacitor and also to the control input of the further semiconductor switching means.

A further embodiment of the power supply circuit according to the invention is characterized in that a first Zener diode, whose cathode is coupled to the first capacitor, is arranged between the control input of the further semiconductor switching means and the junction point of the first resistor and the first capacitor. As a result thereof, the further semiconductor switching means is not switched-on until the instant at which the value of the primary current-filtered secondary voltage combination has reached a limit which is determined by the Zener diode and the threshold voltage of the further semiconductor switching means.

An embodiment of the power supply circuit according to the invention is further characterized in that the second series arrangement of the secondary winding and the rectifier diode provide with terminals for connecting the load, is arranged in series with the main current path of the first semiconductor switch. In such a circuit the load, arranged in parallel with the secondary winding, is not only supplied from the secondary winding of the transformer during the flyback phase, but also directly from the applied input voltage during the forward phase. In addition, in this configuration, during the flyback phase the base of the first transistor becomes negative with respect to the emitter so that the first transistor is turned-off hard.

BRIEF DESCRIPTION OF THE DRAWINGS

The invention will now be described in greater detail by way of example with reference to the accompanying drawings, in which.

DESCRIPTION OF THE PREFERRED EMBODIMENTS

Figure 1:
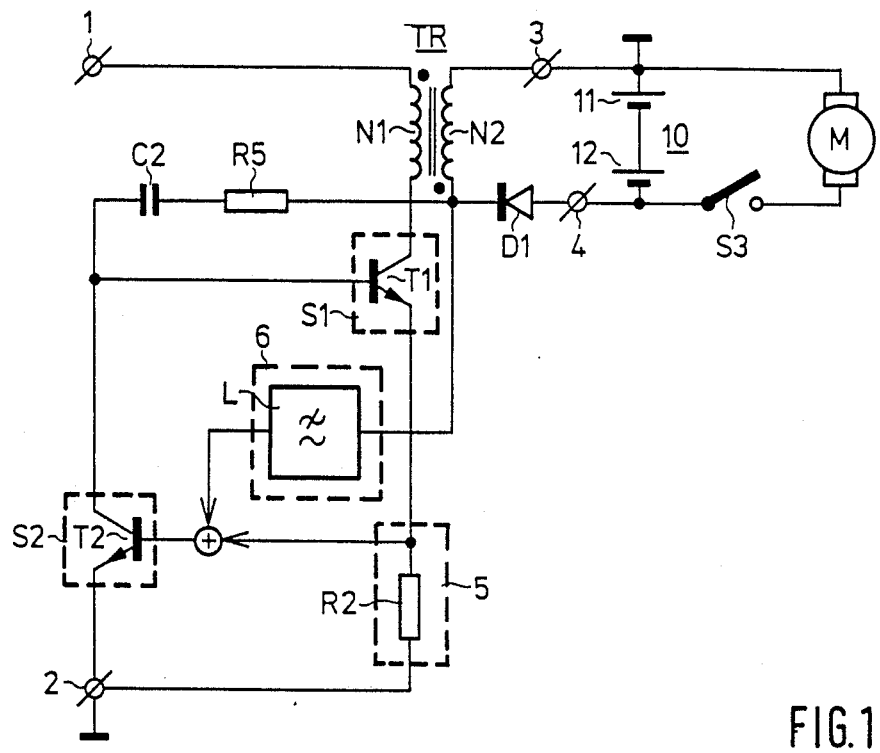
FIG. 1 is a basic circuit diagram of a power supply circuit according to the invention.

FIG. 1 is the basic circuit diagram of a power supply circuit for supplying a load from input voltages of different amplitudes in accordance with the invention. In this Figure a number of components which are not essential to an understanding of the invention have been omitted. The circuit has two input terminals 1 and 2 to which the input voltage is applied. This voltage may be a rectified a.c. voltage or a d.c. voltage. The input voltage is applied to the primary winding $n_1$ of a transformer Tr via the first input terminal 1. The collector-emitter path of a first transistor $T_1$ which constitutes the first semiconductor switch $S_1$ is arranged in series with the primary winding $n_1$. The collector-emitter path of the transistor forms the main current path of the switch. The emitter of the transistor is coupled to the second input terminal 2 and to the negative pole of the input voltage via first means 5, constituted by a resistor $R_2$. The secondary winding $n_2$ of the transformer Tr is arranged in series with a rectifier diode $D_1$ in parallel with the load 10. The load is formed by two nickel cadmium storage batteries 11 and 12 to which, by means of a switch $S_3$, a DC-motor M can be switched in parallel.

The output of the first means 5 is connected to the control input of the further semiconductor switching means $S_2$, formed by a second transistor $T_2$. The junction point of the secondary winding $n_2$ and the rectifier diode $D_1$ is also coupled, via the second means 6, to the control input of the further semiconductor switching means $S_2$, i.e. the base of transistor $T_2$. The second means 6 are constituted by a low-pass filter L so that the voltage across the secondary winding is filtered by the low-pass filter L and is applied to the base of the second transistor $T_2$. The collector of the second transistor $T_2$ is connected to the base of the first transistor, i.e. the control input of the first semiconductor switch.

The circuit operates as follows. Let it be assumed that the switch $S_3$ is open and consequently the circuit supplies the charging current for the storage batteries 11 and 12. In the presence of an input voltage at the input terminals 1 and 2 the semiconductor switch $S_1$ is closed with the aid of the positive feedback circuit formed by the resistor $R_5$ and the capacitor $C_2$. Thereafter the current flowing through the primary winding increases linearly with time. This phase is denoted the forward phase. During the forward phase the junction point between the secondary winding $n_2$ and the rectifier diode $D_1$ has a positive voltage with respect to the other end of the winding. This voltage is applied to the control input of the second semiconductor switching means $S_2$ via the second means 6. Also, the voltage which is proportional to the current through the primary winding $n_1$ and is received from the first means 5 is applied to this control input. When the combination of the two voltages has reached a predetermined level, a current flows into the base of the second transistor $T_2$ and the further semiconductor switching means $S_2$ close, which causes the first semiconductor switch $S_1$ to be opened. Since, after opening of switch $S_1$ the primary current becomes equal to zero, the polarity of the voltage across the secondary winding $n_2$ reverses and the junction point with the diode $D_1$ becomes negative so that the diode $D_1$ is rendered conductive. The energy stored in the transformer Tr during the forward phase is now applied, during what is commonly denoted the flyback phase, in the form of a charging current to the storage batteries 11 and 12 via diode $D_1$. This current decreases linearly with time to zero, whereafter the first switch $S_1$ is closed again and a subsequent forward phase is initiated.

Since the second means 6 include a low-pass filter L, the voltage across the secondary winding is filtered before it is applied to the control input of the further semiconductor switching means. Because of the non-linear characteristic of the low-pass filter the period of time elapsing before the further semiconductor switching means is closed is reduced more than proportionally in the case of a high input voltage and consequently a higher value of the voltage across the secondary winding. The forward phase is then terminated at a lower level of the primary current so that the increase in the output current is compensated at a higher input voltage.

If the switch $S_3$ is closed the circuit directly produces the direct current for the d.c. motor M. In this situation an additional resistor, not shown, can be arranged in parallel with the resistor $R_2$ so that at a higher value of the current flowing through the primary winding the further semiconductor switching means $S_2$ are closed and the first semiconductor switch $S_1$ is opened. In this situation the circuit produces a larger output current. In all other respects the operation of the power supply circuit is identical to the situation already described in the foregoing.

Figure 2:
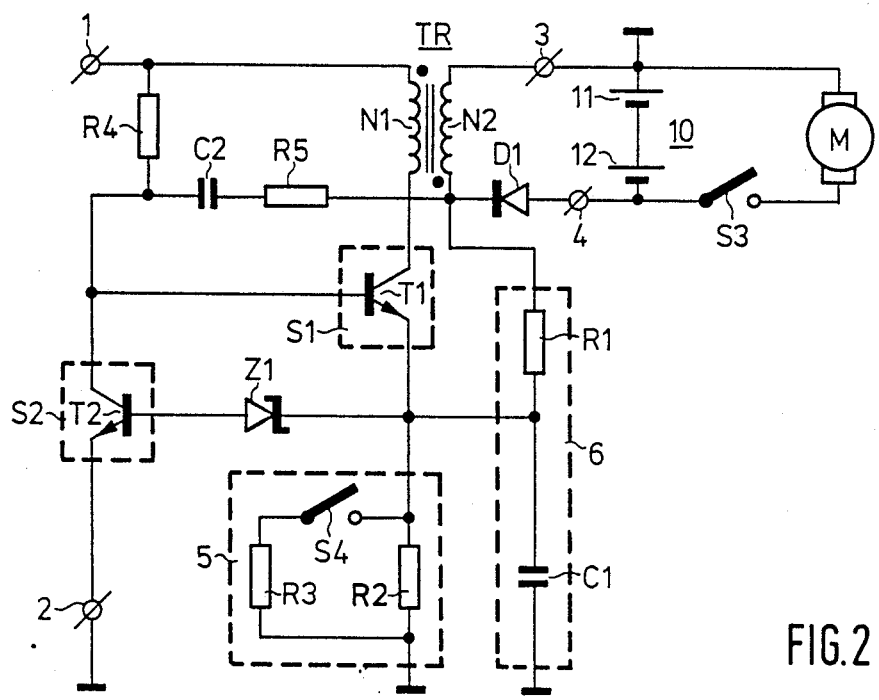
FIG. 2 shows a first embodiment of a power supply circuit according to the invention.

FIG. 2 shows a first embodiment of the circuit according to the invention. The low-pass filter incorporated in the second means 6 is formed by a series arrangement of a resistor $R_1$ and a capacitor $C_1$. That terminal of the resistor that faces away from the capacitor is connected to the end of the secondary winding $n_2$ of the transformer Tr. The output of the low-pass filter, the junction point of the resistor $R_1$ and the capacitor $C_1$, is coupled to the base of the transistor $T_2$ which constitutes the further semiconductor switching means $S_2$. The base of the transistor $T_2$ is also coupled to the connection point of the first means 5 for supplying this base with a signal which is a measure of the magnitude of the primary current. Consequently, the voltage at the base of the second transistor $T_2$ is the sum of the magnitude of the voltage at the output of the first means 5 and the filtered voltage across the secondary winding.

In the circuit shown in FIG. 2 the first means 5 are constituted by a resistor $R_2$ which is arranged in series with the primary winding $n_1$ and with the first semiconductor switch $S_1$. A third resistor $R_3$ can be arranged parallel to the resistor $R_2$ by means of a switch $S_4$. The switch $S_4$ is closed simultaneously with the switch $S_3$ for switching-on the motor so that the resistance value of the first means 5 is reduced simultaneously.

In addition, the circuit shown in FIG. 2 includes a starter resistor $R_4$ and a positive feedback circuit comprising a resistor $R_5$ and a capacitor $C_2$ for initiating the forward phase. On switch-on of the input voltage across the terminals 1 and 2 of the power supply circuit a small current flows into the base of the first transistor $T_1$ via the resistor $R_4$. This causes this transistor to become slightly conductive and a small current starts to flow through the primary winding $n_1$. This results in a voltage being produced across the secondary winding $n_2$, in response to which a current flows again in the base of the transistor $T_1$ via the positive feedback circuit formed by the resistor $R_5$ and the capacitor $C_2$. This causes the transistor $T_1$ to become rapidly conductive to a greater extent and the forward phase is started. In all further respects the mode of operation of the circuit of FIG. 2 is identical to the mode of operation of the basic circuit diagram described with reference to FIG. 1 and will not be repeated here.

The first and second means 5 and 6 for suppling the base of the transistor $T_2$ with a signal which is a measure of the primary current and with a signal which is a measure of the filtered secondary voltage can directly be connected to the transistor $T_2$ but, as is shown in FIG. 2, a Zener diode $Z_1$ may be provided between said means and the base. This has the advantage that the sum of the voltages at the outputs of the means 5 and 6 may exceed the control voltage of the transistor. The adaptation of these voltages is then realized with the aid of the Zener diode.

Figure 3:
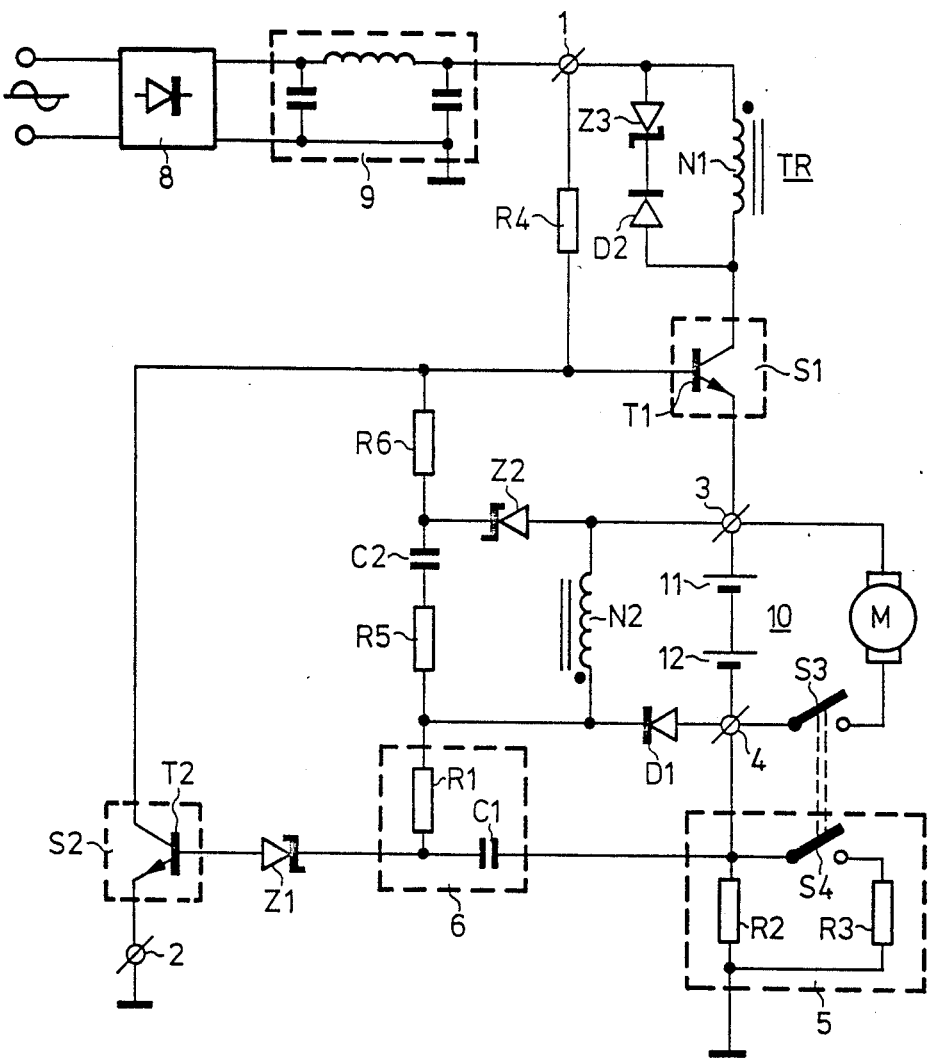
FIG. 3 shows an embodiment in which the load is arranged in series with the main current path of the first semiconductor switch.

FIG. 3 shows a second embodiment of the power supply circuit according to the invention. In this Figure elements identical to those in the FIGS. 1 and 2 are given the same references. In contrast to the preceding Figures, the secondary winding $n_2$ and the load 10 arranged in parallel therewith are here arranged in series with the primary winding $n_1$ of the transformer Tr. This has the advantage that the load is not only supplied from the secondary winding during the flyback phase but is also directly supplied during the forward phase from the applied voltage. In addition, in this configuration, the switching behavior of the transistor $T_1$ is advantageously influenced as namely the voltage at the emitter of the transistor $T_1$ is raised to the positive voltage across the storage batteries 10 and 11. When, during the flyback phase, the second transistor $T_2$ is conductive, the base of the first transistor $T_1$ is connected to a lower voltage and consequently is negative relative to the emitter. So the first transistor $T_1$ is abruptly switched-off during the flyback phase.

The circuit shown in FIG. 3 is supplied from an a.c. voltage which is rectified by means of a rectifier bridge 8 and a smoothing filter 9. The rectified voltage is applied via the first terminal 1 to the first end of the primary winding $n_1$ of the transformer Tr. A circuit formed by a diode $D_2$ and a Zener diode $Z_3$ is arranged in parallel with the primary winding to prevent voltage peaks on switch-off of the primary current. The forward phase is effected in an identical manner as for the circuit of FIG. 2, with the aid of the starter resistor $R_4$ and the positive feedback formed by the resistors $R_5$ and $R_6$ and the capacitor $C_2$. Also the further operation of the circuit is identical to the mode of operation described with reference to FIG. 2 and will consequently not be described in further detail here.

In contrast to the embodiment shown in FIG. 2, this circuit is however provided with a Zener diode $Z_2$ whose anode is coupled to that end of the main current path of the transistor $T_1$ that is remote from the primary winding. The cathode is connected to that terminal of the resistor $R_6$ in the positive feedback circuit that is remote from the base of transistor $T_1$. With the aid of this Zener diode $Z_2$, the current flowing into the base of the transistor $T_1$ via the positive feedback circuit is limited so that the transistor $T_1$ is not driven too far into saturation. This prevents an excessive delay on turn-off of the transistor $T_1$ after transistor $T_2$ has become conductive, and consequently the primary current is prevented from increasing still further after the further semiconductor switching means $S_2$ have closed.

Figure 4:
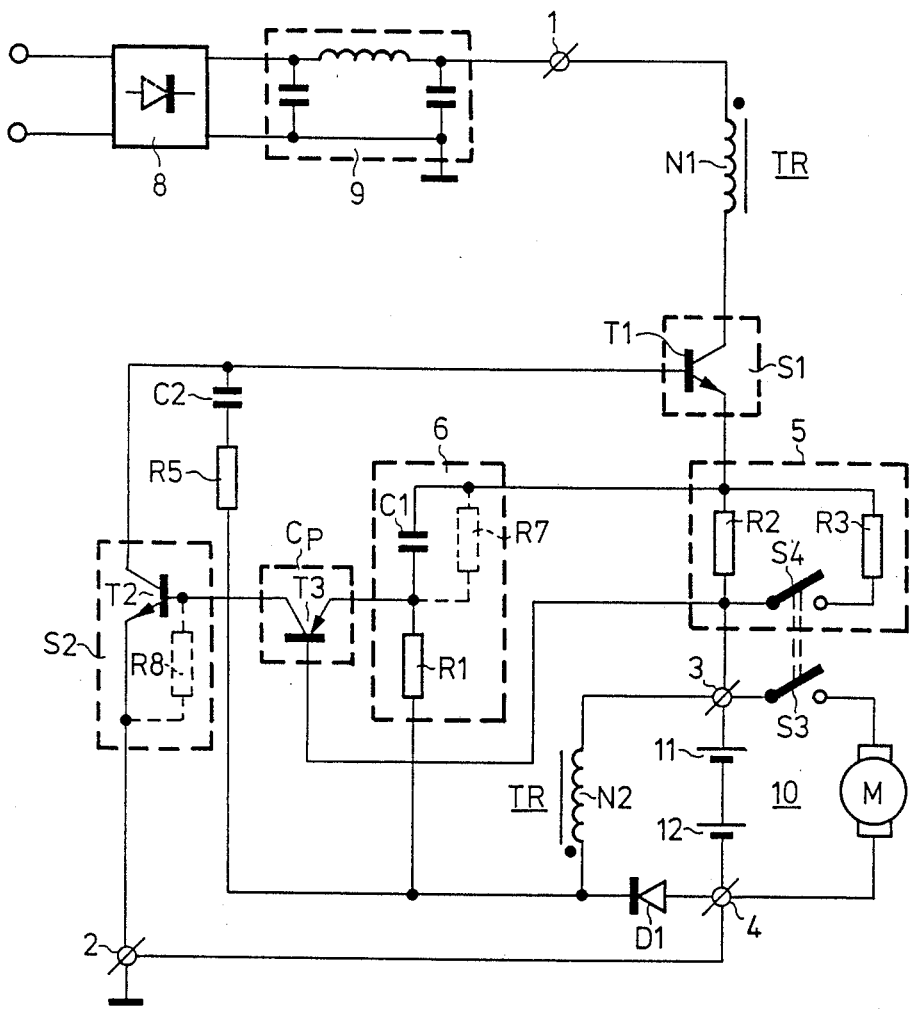
FIG. 4 shows a further embodiment of the power supply circuit according to the invention.

FIG. 4 is a circuit diagram of another embodiment of the power supply circuit according to the invention. The power supply circuit again comprises a series arrangement of the primary winding $n_1$ of the transformer Tr, the main current path of a first transistor $T_1$ which constitutes the first semiconductor switch $S_1$, and first means 5 for supplying the base of a second transistor $T_2$, which form the further semiconductor switching means $S_2$, with a signal which is a measure of the magnitude of the current through the primary winding. Similar to the circuit shown in FIG. 3, the load 10 is arranged in series with the primary winding $n_1$. However, in contrast to the embodiment shown in FIG. 3, the load is positioned at that side of the first means 5 that is remote from the primary winding. Similar to the embodiment shown in the foregoing, the load 10 is arranged in parallel with a series arrangement formed by the secondary winding $n_2$ of the transformer Tr and a rectifier diode $D_1$. The first means 5 are formed by a resistor $R_2$ and a resistor $R_3$ which is switchable in parallel therewith. The low-pass filter constituted by the series arrangement of the capacitor $C_1$ and the resistor $R_1$ has one side coupled to the junction point between the secondary winding $n_2$ and the rectifier diode $D_1$. The other side of the low-pass filter is coupled to the input terminal 2 of the power supply circuit via the resistor $R_2$ and the storage batteries 11 and 12. The output of the low-pass filter is coupled to the non-inverting input of a comparator $C_p$ which is formed by the emitter of a PNP-transistor $T_3$. That terminal of the resistor $R_2$ that is remote from the first transistor is coupled to the inverting input of the comparator $C_1$. The base of the PNP-transistor $T_3$.

The circuit operates as follows. Let it be assumed that the switches $S_3$ and $S_4$ are open. The junction point of the resistor $R_2$ with the base of the PNP-transistor $T_3$ and the load 10 is taken as a reference point for the voltages occurring in the circuit.

After the first transistor $T_1$ has become conductive a primary current of increasing strength starts flowing through the primary winding $n_1$ of the transformer Tr, the main current path of the first transistor $T_1$, the resistor $R_2$ and the load 10. In response to this current a positive voltage is produced at that end of the secondary winding $n_2$ that faces away from the reference point. After having been filtered by a low-pass filter formed by the resistor $R_1$ and the capacitor $C_1$ this voltage is applied to the emitter of the PNP-transistor $T_3$. During the forward phase a voltage of increasing magnitude which is proportional to the primary current is produced across the resistor $R_2$. This voltage is applied in the filtered state to the base-emitter junction of the transistor $T_3$ via the capacitor $C_1$. During the forward phase the base-emitter voltage of the PNP-transistor $T_3$ consequently increases by the superpositioning of a first component which is proportional to the primary current and a second component which, via the low-pass filter, is derived from the voltage across the secondary winding. At a predetermined value of the base-emitter voltage across the PNP-transistor $T_3$, this transistor becomes conductive and a current flows from the collector of the PNP-transistor, the output of the comparator $C_p$, into the base of the second transistor $T_2$ which constitutes the further semiconductor switching means. In a manner similar to that in the circuit described in the foregoing, this transistor becomes conductive, which causes the first transistor $T_1$ to be rendered non-conducting and the forward phase to be terminated.

The circuit further includes a starter resistor $R_4$ and a positive feedback circuit for starting the forward phase. The positive feedback circuit is, for example, formed by a series arrangement of a capacitor $C_2$ and a resistor $R_5$ which connects the secondary winding $n_2$ of the transformer to the base of the transistor $T_1$. The positions of the resistor $R_5$ and the capacitor $C_2$ are interchangeable. The positive feedback circuit may alternatively be connected to that end of the resistor $R_1$ that is remote from the secondary winding. The mode of operation of the starter resistor and the positive feedback circuit is identical to the mode of operation of the same elements in the circuit of FIG. 2 and will therefore not be repeated here.

So as to adapt the characteristic of the low-pass filter to an optimum extent the filter may be provided with further passive elements, for example, a resistor $R_7$ which is arranged in parallel with the capacitor $C_1$. This resistor $R_7$ is indicated by means of a dashed line in FIG. 4.

In order to provide an improvement in the switching behavior of the second transistor $T_2$, a resistor $R_8$ can further be arranged between the base and the emitter of this transistor. This resistor $R_8$ also is indicated by means of a dashed line in FIG. 4.

Figure 5:
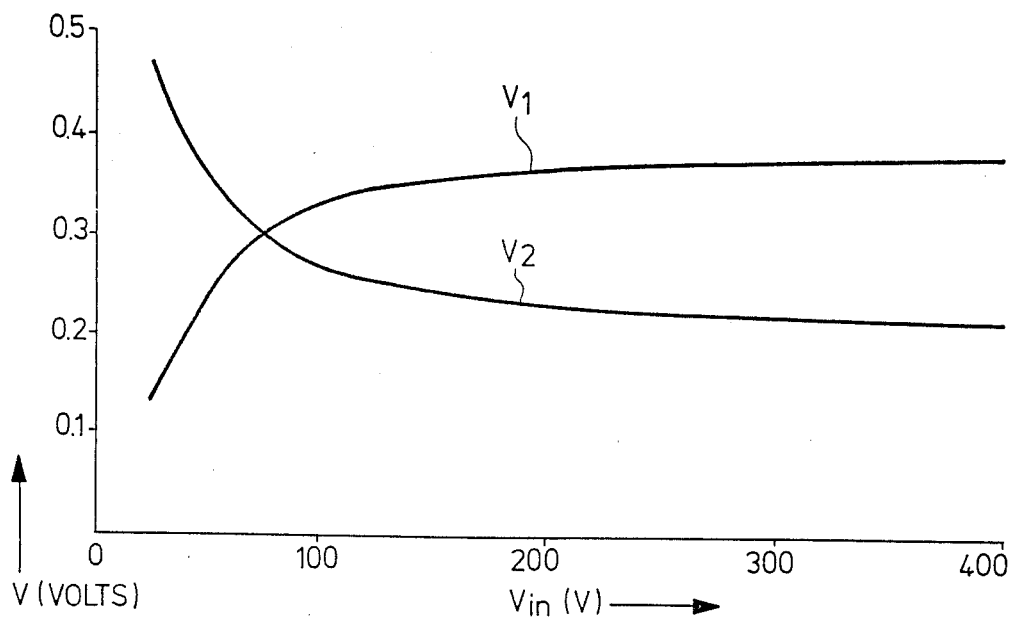
FIG. 5 shows waveforms illustrating the dependence of the input voltage on the two voltage components at the control input of the further semiconductor switching means.

FIG. 5 shows the magnitude of the voltage components at the termination point of the forward phase as a function of the input voltage $V_{in}$. The curve denoted by $V_1$ shows the dependence of the filtered voltage across the secondary winding of the transformer. The curve $V_2$ shows the value of the voltage drop across the resistor $R_2$ at the end of the forward phase as a function of the input voltage. The sum of the two voltages $V_1$ and $V_2$ amounts in this graph to 0.6 Volt, the base-emitter voltage at which the second transistor $T_2$ is rendered conductive.

Figure 6:
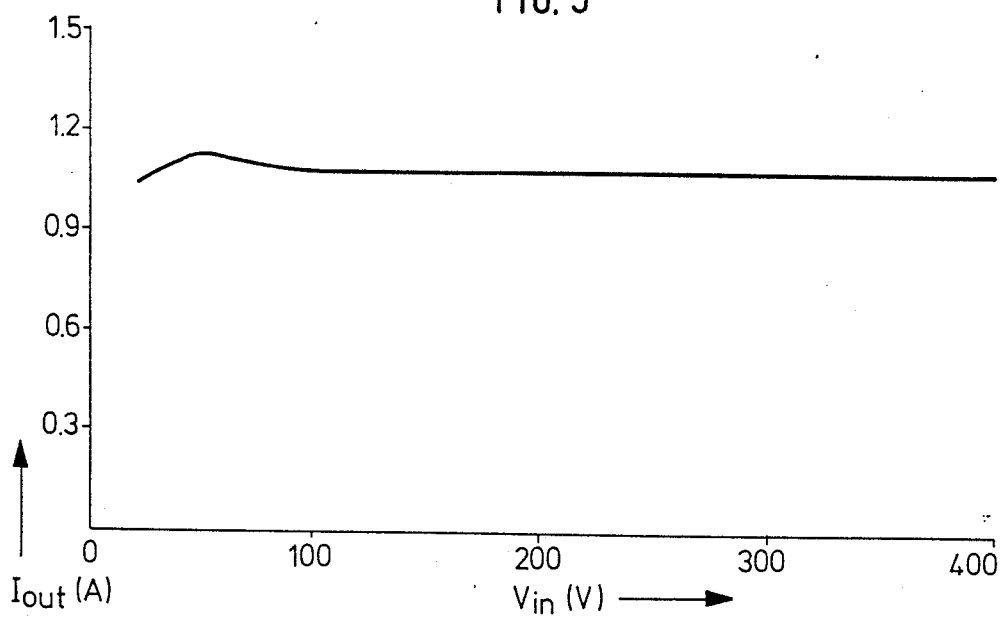
FIG. 6 shows an input voltage-output current characteristic of the power supply circuit according to the invention.

FIG. 6 shows the input voltage-output current characteristic of a power supply circuit according to the invention. From this Figure it can directly be seen that an amplitude of approximately 1100 mA for the output current is reached already at the relatively low value of 75 Volts and that the output current strength varies very little up to an input voltage of at least 400 Volts.

I claim:

1. A power supply circuit for supplying a load from input voltages of different magnitude, comprising a first series arrangement of a primary winding ($n_1$) of a transformer and a main current path of a first semiconductor switch which also has a control input, a second series arrangement of a secondary winding ($n_2$) of the transformer and a rectifier diode, said second series arrangement having terminals for connection of the load, a further semiconductor switching means, provided with a control input, for switching-off the first semiconductor switch, and first means for supplying the control input of the further semiconductor switching means with a first signal which is a measure of the current flowing through the primary winding, and second means for supplying the control input of the further semiconductor switching means with a second non-linear signal which is proportional to a voltage at the output of a low-pass filter connected to filter the voltage across the secondary winding during a period of time in which the first semiconductor switch is closed.

2. A power supply circuit as claimed in claim 1, wherein the low-pass filter comprises a resistor and a capacitor and means coupling, a first terminal of the resistor to one end of the secondary winding ($n_2$) and a second terminal of the resistor to a first terminal of the capacitor and also to the control input of the further semiconductor switching means.

3. A power supply circuit as claimed in claim 2, wherein said coupling means includes Zener diode coupled between the control input of the further semiconductor switching means and a junction point of the resistor and the capacitor.

4. A power supply circuit as claimed in claim 3 wherein the second series arrangement of the secondary winding ($n_2$) and the rectifier diode is connected in series with the main current path of the first semiconductor switch.

5. A power supply circuit as claimed in claim 1, wherein the second series arrangement of the secondary winding ($n_2$) and the rectifier diode is connected in series with the main current path of the first semiconductor switch.

6. A power supply circuit as claimed in claim 1 wherein said load comprises a motor and a battery coupled to said load connection terminals.

7. A self-oscillating power supply circuit for supplying a load from input voltages of different magnitude comprising:
 a pair of input terminals for connection to an input voltage,
 a transformer having a primary winding and a secondary winding,
 means connecting the primary winding and a first switching transistor in series circuit across said input terminals,
 a second switching transistor coupled to a control electrode of the first switching transistor for switching-off the first switching transistor,
 means connecting the secondary winding and a diode in a second series circuit which includes terminals for connection of the load,
 first means for supplying a control input of the second switching transistor with a first signal indicative of the level of current flow in the primary winding, and
 second means including a low-pass filter coupled between said secondary winding and the control input of the second switching transistor for supplying said control input with a second, non-linear, signal derived from an AC voltage generated in the secondary winding.

8. A power supply circuit as claimed in claim 7 further comprising a positive feedback circuit coupled between said secondary winding and said control electrode of the first switching transistor.

9. A power supply circuit as claimed in claim 7 wherein said low-pass filter comprises an RC circuit and wherein said first and second signals are combined to provide a control voltage at the control input of the second switching transistor which is the sum of said first and second signals.

10. A power supply circuit as claimed in claim 7 further comprising means connecting said second series circuit in series with said primary winding and said first switching transistor across said input terminals.

11. A power supply circuit as claimed in claim 7 further comprising a voltage-dependent breakdown element coupling said first and second signals to said control input of the second switching transistor.

12. A power supply circuit as claimed in claim 7 wherein said load includes a motor coupled to said load connection terminals via a first switch,
 wherein said first signal supplying means includes a first resistor connected in series with the primary winding and the first switching transistor across the input terminals, said power supply circuit further comprising,
 a second switch coupled to said first switch so as to operate in synchronim therewith, and
 a second resistor coupled in parallel with the first resistor via said second switch.

13. A power supply circuit as claimed in claim 7 wherein the low-pass filter comprises a resistor and a capacitor, and means coupling a first terminal of the resistor to one end of the secondary winding and a second terminal of the resistor to a first terminal of the capacitor and also to the control input of the second switching transistor, wherein the RC circuit including the capacitor and the resistor has a time constant which is comparable to the on time of the first switching transistor thereby to provide a more than proportional reduction of said on time as a function of an increase in the input voltage.

* * * * *